UNITED STATES PATENT OFFICE 2,430,017

MILDEWPROOFING TEXTILES

Alva L. Houk, Philadelphia, Pa., assignor to Röhm & Haas Company, Philadelphia, Pa., a corporation of Delaware No Drawing. Application March 8, 1945,
Serial No. 581,723

20 Claims. (Cl. 117—138.5)

This invention relates to a process for preserving cellulosic textile materials and preventing their rapid deterioration from attacks by fungi and other organisms, particularly under conditions in which ordinary mildewproofing agents are removed by leaching.

Although a number of agents have been applied to textiles to prevent mildewing and tendering under conditions in which the treated textiles are exposed to heat and humidity such as prevail in tropical regions, no agent has come into use which is free from serious objections and has the requisite properties, such as high effectiveness against many different types of organisms which may be encountered, adequate retention under conditions of leaching, and safety to those handling the preserving agents and the textile materials treated therewith.

I have found that by impregnating cellulosic textile materials with a pentahalophenyl ester of the formula:

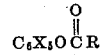

wherein X is chlorine or bromine and R is the residue of a carboxylic acid, including hydrogen (from formic acid), there is produced a mildew-resistant product which is superior to any such product which has heretofore been available. The products which are obtained by this process maintain their strength for long periods of time even under highly adverse conditions of heat, humidity, and leaching. Neither the operators performing the process nor workers handling the impregnated textile materials will suffer from dermatitis because of the particular agents used.

The pentahalophenyl esters of carboxylic acids may be prepared in a number of ways. For example, a pentahalophenate, such as sodium pentachlorophenate, may be reacted with an acid halide, conveniently in an organic solvent in which sodium chloride is insoluble, and the solvent solution, freed from salt, used for impregnating textile material, or worked up to isolate the pentahalophenyl ester.

In another procedure, a pentahalophenol is reacted with an acid anhydride and the resulting ester and acid separated. Similarly, the phenyl esters may be formed by ordinary esterification procedures from pentahalophenol and carboxylic acid.

The carboxylic acid portion of the pentahalophenyl esters may be that obtained from formic, acetic, propionic, butyric, isobutyric, caproic, lauric, palmitic, oleic, stearic, acrylic, crotonic, adipic, azelaic, sebacic, butoxyacetic, octyloxyacetic, ethyl carbonic, furoic, naphthenic, phthalic, phenylacetic, phenoxyacetic, chloroacetic, benzoic, nitrobenzoic, etc. Thus, the acid portion may be derived from any carboxylic acid, aliphatic, arylaliphatic, aromatic, cycloaliphatic, or heterocyclic. It has been found that esters from any of the carboxylic acids and pentahalophenols have advantages over the pentahalophenols or their salts.

Typical procedures for the preparation of these esters are shown in the following examples.

Example A

A solution of 72 parts of sodium pentachlorophenate in 200 parts of methyl isobutyl ketone was treated with 37 parts of benzoyl chloride while the temperature of the reacting mixture was held at 5° to 10° C. After the mixture had been stirred for an hour and slightly warmed, it was filtered and the salt removed with water. The pentachlorophenyl benzoate was crystallized from ethyl acetate. There was thus obtained fifty-six parts of crystalline material melting at 158°–163° C. Analysis showed 47.62% chlorine (theory for $C_{13}H_5Cl_5O_2$, 47.8%) and a saponification number of 308 (theory, 303).

Example B

A mixture of 266.5 parts of pentachlorophenol and 122 parts of acetic anhydride was heated at 138° C. to 165° C. while acetic acid as it was formed was removed through a packed column. When acetic acid was no longer obtained, the reaction mixture was heated under reduced pressure to remove excess anhydride. The residue was crystallized from a mixture of benzene and methyl ethyl ketone to yield the desired ester in crystalline form. The yield was 234 parts in the first crop of crystals, melting point 147°–150° C. Analysis showed 57.42% chlorine (theory for $C_8H_3Cl_5O_2$, 57.4%) and a saponification number of 366 (theory, 363).

Example C

A mixture of 101 parts of sebacic acid, 112 parts of acetic anhydride, and 267 parts of pentachlorophenol was heated and acetic acid distilled off through a packed column as formed. The residue was crystallized from ethyl acetate to give a solid melting at 115°–120° C., consisting primarily of pentachlorophenyl sebacate. The yield was 162 parts, containing 48.45% chlorine (theory for $C_{22}H_{16}Cl_{10}O_4$, 50.8%) and having a saponification number of 328 (theory, 320).

Example D

A mixture of 133 parts of pentachlorophenol, fifty-six parts of acetic anhydride, and seventy-six parts of phenoxyacetic acid with a trace of hydroquinone was heated under a column to approximately 200° C. The acetic acid was distilled off under 500–600 mm. pressure, leaving a black residue. Crystallization from a benzene-ethanol mixture gave eighty-six parts in the first crop, melting point 120° to 124° C. Analysis showed 43.63% chlorine (theory for $C_{14}H_7Cl_5O_3$, 44.3%) and a saponification number of 280 (theory, 280).

By similar methods, there may be prepared ethyl pentachlorophenyl carbonate (melting point 65°–70° C.), pentachlorophenyl laurate (boiling point 198° C./4 mm.–235° C./3 mm.), pentabromophenyl hexoate, pentachlorophenyl-2-ethyl hexoate (boiling point 160° to 200° C./5 mm.), pentachlorophenyl isobutyrate (melting point 70° to 78° C.), pentachlorophenyl octyloxyacetate, pentabromophenyl acetate (melting point 193° to 196° C.), pentachlorophenyl tert.-butyl phenoxyacetate (melting point 111° to 115° C.), and the like.

For application to a cellulosic textile material, such as woven or knitted fabric, tape, ribbon, thread, yarn, or the like, a solution of a pentahalophenyl ester in a volatile solvent may be applied thereto. Alternatively, a dispersion of a solution in water or an aqueous dispersion of the ester itself may be applied to a textile material. For preparing solutions there may be used petroleum solvents, benzene, toluene, ethyl alcohol, isopropanol, or similar solvent. For dispersions there may be used such agents as triethanolamine oleate, a polyethylene glycol ester of a long-chained fatty acid, or a long-chained alcohol, a surface active alkyl or alkyl-aryl sulfate or sulfonate, or a high molecular weight quaternary ammonium salt, such as octadecyl dimethyl benzyl ammonium chloride, or a tertiary amine salt, such as triethanolamine oleate.

The application of the pentahalophenyl esters to textiles is illustrated by the following examples.

Example 1

Ten parts of pentachlorophenyl acetate was dissolved in 1,000 parts of petroleum ether, boiling point 90°–120° C. An 80 x 80 cotton sheeting was padded through this solution, given a slight squeeze, and dried in a current of air at 80° C.

Example 2

Ten parts of pentachlorophenyl laurate was dissolved in 10 parts of petroleum ether, boiling point 90°–120° C., and added with vigorous agitation to a solution containing four parts of triethanolamine oleate and four parts of decaethylene glycol mono-p-octylphenyl ether in twelve parts of water. The emulsion so obtained was poured into 960 parts of water. Osnaburg fabric was padded through the resulting dispersion, given a slight squeeze, and dried in a current of air at 45° C.

Fabrics which had been treated by such procedures so as to contain 0.1% to 1% or more of a pentahalophenyl ester, based on the weight of the fabric, were subjected to tests against various organisms. Not only were different types of cotton fabric thus tested, but also fabrics which were freshly prepared and others which were leached in running tap water for twenty-four hours.

The tests were performed by placing sterile strips of fabrics in tubes of sterile agar containing nutrient salts. The strips were then inoculated with suspensions of spores of different selected fungi, such as *Chaetomium globosum*, *Metarrhizium sp.*, or *Aspergillus niger*. The inoculated strips were incubated for a week at 30° C. Growth or lack of growth was noted. Finally, tensile strength determinations were made in the case of organisms known to attack cellulose.

Results are summarized for typical tests as follows for the compounds indicated:

Pentachlorophenyl sebacate—no visible growth with *Metarrhizium sp.* or *Chaetomium globosum* and practically complete retention of original strength, whether leached or unleached.

Pentabromophenyl acetate—no visible growth on either Osnaburg or muslin, although a slight loss of strength with muslin, but no loss with Osnaburg.

Pentachlorophenyl acetate—no growth with any of the organisms tested, including *Metarrhizium sp.*, *Chaetomium globosum*, and *Aspergillus niger*; retention of tensile strength.

Pentachlorophenyl laurate—no growth of *Metarrhizium sp.* on Osnaburg, whether leached or unleached; retention of tensile strength.

Pentachlorophenyl ethyl carbonate—no growth on Osnaburg or muslin, whether leached or unleached; retention of tensile strength.

Pentachlorophenyl octyloxyacetate—no growth on Osnaburg or muslin, whether leached or unleached; retention of tensile strength.

Pentachlorophenyl benzoate—no growth with *Metarrhizium sp.*, whether fabrics are leached or unleached; retention of tensile strength.

The process of this invention may be applied to all types of cellulosic material to guard against fungal attack. Not only may fabrics and yarns of cotton be protected, but also those of cellulose ethers and esters, regenerated cellulose, and paper. Furthermore, the process is applicable to batting, cords, strings, and ropes. Cellulosic materials protected by this process are useful in tentings, awnings, ground cloths, tarpaulins, mosquito netting, and the like, to prevent mildewing and tendering under unusually adverse conditions.

The process of this invention may also be applied to objects, such as ropes and woven fabrics, from linen, hemp, ramie, sisal, and similar bast fibers. It may also be applied to other types of textile materials which require protection under exposure to conditions in which attack by fungi and bacteria may be encountered. These include wool, silk, and synthetic protein fibers (as from casein). Leather may also be considered in this class, as it, too, is a fibrous material which may be subject to attack by fungi and bacteria. In fact, any fibrous material or textile material may advantageously be treated by the process of this invention for the purpose of preserving it.

I claim:

1. The process of preparing mildew-resistant cellulosic materials which comprises impregnating a cellulosic material with a pentahalophenyl ester of a carboxylic acid in which the halogen is selected from the group consisting of chlorine and bromine.

2. The process of preparing mildew-resistant cellulosic materials which comprises impregnating said materials with a solution of a pentachlorophenyl ester of a monocarboxylic acid in a volatile organic solvent and removing said solvent.

3. The process of preparing mildew-resistant cellulosic materials which comprises impregnating said materials with a solution of a pentabromophenyl ester of a monocarboxylic acid in a volatile organic solvent and removing said solvent.

4. The process of preparing mildew-resistant cellulosic materials which comprises impregnating said materials with an aqueous dispersion of a pentahalophenyl ester of a carboxylic ester, in which the halogen is selected from the group consisting of chlorine and bromine, and drying the impregnated material.

5. The process of preparing mildew-resistant cellulosic materials which comprises impregnating said materials with an aqueous dispersion of a pentachlorophenyl ester of an aliphatic monocarboxylic acid and drying the impregnated material.

6. The process of preparing mildew-resistant cellulosic materials which comprises impregnating said materials with an aqueous dispersion of a pentabromophenyl ester of an aliphatic monocarboxylic acid and drying the impregnated material.

7. The process of preparing mildew-resistant cellulosic materials which comprises impregnating said materials with an aqueous dispersion of pentachlorophenyl acetate and drying the impregnated material.

8. The process of preparing mildew-resistant cellulosic materials which comprises impregnating said materials with an aqueous dispersion of pentachlorphenyl phenoxyacetate and drying the impregnated material.

9. The process of preparing mildew-resistant cellulosic materials which comprises impregnating said materials with an aqueous dispersion of pentachlorophenyl octyloxyacetate and drying the impregnated material.

10. The process of preparing mildew-resistant cotton fabrics which comprises impregnating said fabrics with a pentahalophenyl ester of a carboxylic acid in which the halogen is selected from the group consisting of chlorine and bromine.

11. The process of preparing mildew-resistant cotton fabrics which comprises impregnating said fabrics with a pentachlorophenyl ester of an aliphatic monocarboxylic acid.

12. The process of preparing mildew-resistant cotton fabrics which comprises impregnating said fabrics with a solution of a pentachlorophenyl ester of an aliphatic monocarboxylic acid in a volatile organic solvent therefor and removing said solvent.

13. The process of preparing mildew-resistant textile materials which comprises impregnating a textile material with a pentahalophenyl ester of a carboxylic acid in which the halogen is selected from the group consisting of chlorine and bromine.

14. Cellulosic fabrics, yarn, battings, and the like, resistant to the growth of fungi thereon, retaining this resistance even under leaching conditions, and carrying a pentachlorophenyl ester of an aliphatic monocarboxylic acid.

15. Cellulosic fabrics, yarn, battings, and the like, resistant to the growth of fungi thereon, retaining this resistance even under leaching conditions, and carrying a pentabromophenyl ester of an aliphatic monocarboxylic acid.

16. Cotton fabrics, yarns, battings, and the like, resistant to the growth of fungi thereon, retaining this resistance even under leaching conditions, and carrying a pentachlorophenyl ester of an aliphatic monocarboxylic acid.

17. Cotton fabrics, yarns, battings, and the like, resistant to the growth of fungi thereon, retaining this resistance even under leaching conditions, and carrying a pentachlorophenyl ester of acetic acid.

18. Cotton fabrics, yarns, battings, and the like, resistant to the growth of fungi thereon, retaining this resistance even under leaching conditions, and carrying a pentachlorophenyl ester of octyloxy acetic acid.

19. Cellulosic fabrics, yarn, battings, and the like, resistant to the growth of fungi thereon, retaining this resistance even under leaching conditions, and carrying a pentahalophenyl ester of a carboxylic acid in which the halogen is selected from the group consisting of chlorine and bromine.

20. Textile materials resistant to the growth of fungi and other organisms thereon, retaining this resistance even under leaching conditions, and carrying a pentahalophenyl ester of a carboxylic acid in which the halogen is selected from the group consisting of chlorine and bromine.

ALVA L. HOUK.

REFERENCES CITED

The following references are of record in the file of this patent:

UNITED STATES PATENTS

| Number | Name | Date |
| --- | --- | --- |
| 2,182,081 | Hatfield | Dec. 5, 1939 |
| 2,209,970 | Hay | Aug. 6, 1940 |

OTHER REFERENCES

Abstracts, Soc. of Dyes & Colorists, vol. 58, No. 1, Jan. 1942, page 23.